(No Model.) 3 Sheets—Sheet 1.

T. SANDS.
SHEDDING MECHANISM FOR POWER LOOMS.

No. 250,679. Patented Dec. 13, 1881.

Witnesses: Inventor.

(No Model.) 3 Sheets—Sheet 2.
T. SANDS.
SHEDDING MECHANISM FOR POWER LOOMS.
No. 250,679. Patented Dec. 13, 1881.
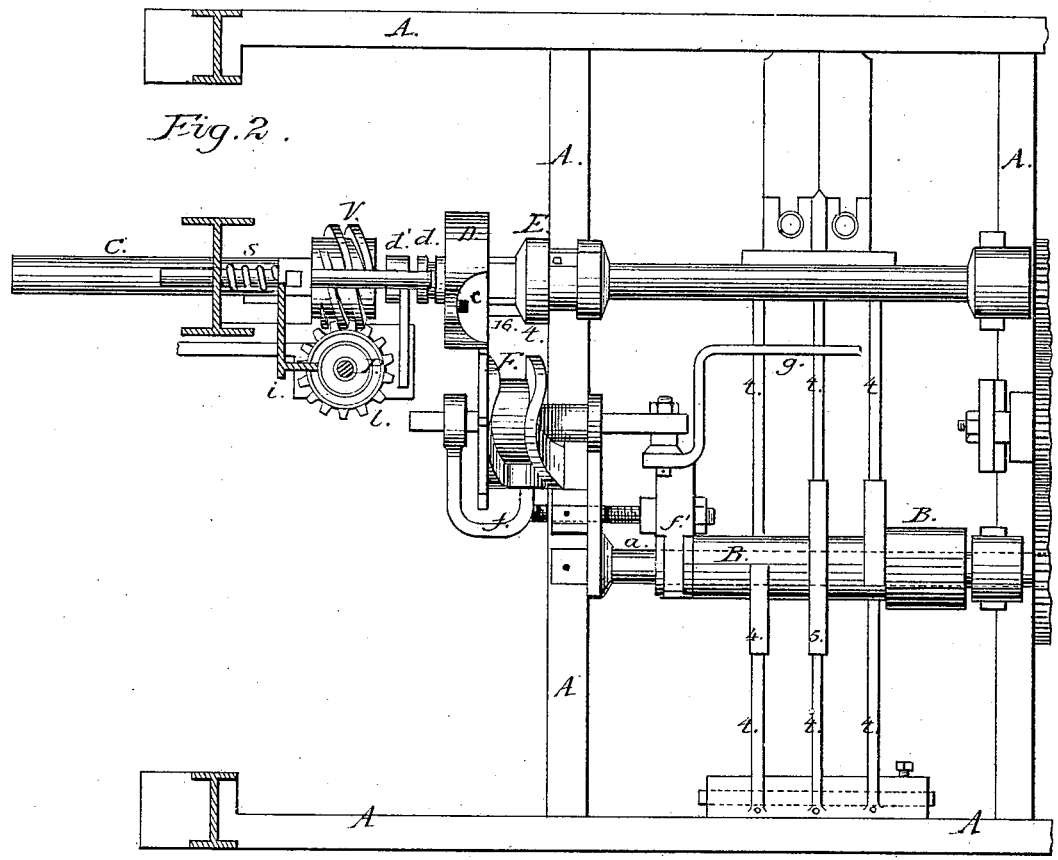
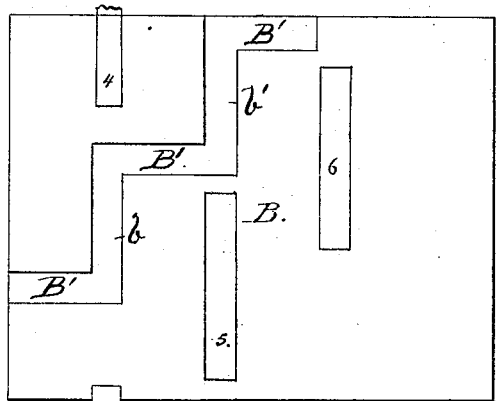
Witnesses:
Edw. D. Stafford
Wm. C. Dey.
Inventor:
Thomas Sands
by his attorney
Thomas D. Stetson
N. PETERS, Photo-Lithographer, Washington, D. C.

(No Model.) 3 Sheets—Sheet 3.
T. SANDS.
SHEDDING MECHANISM FOR POWER LOOMS.
No. 250,679. Patented Dec. 13, 1881.
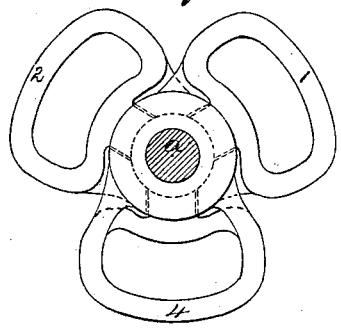
Fig. 5.
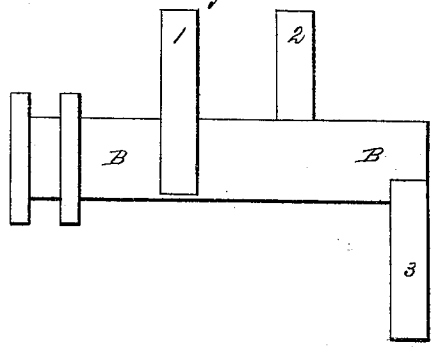
Fig. 7.
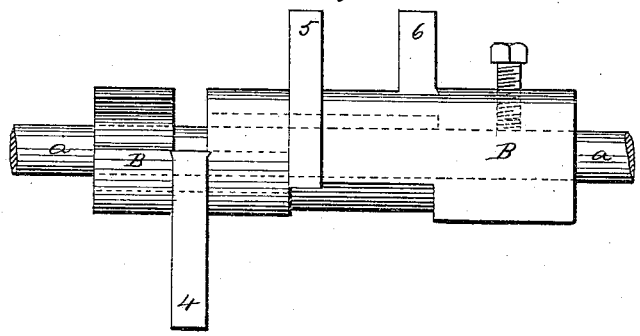
Fig. 8.
Fig. 6.
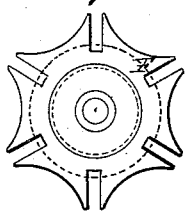
Fig. 9.
Fig. 10.
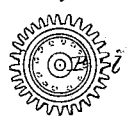
Fig. 13.
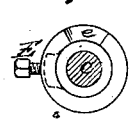
Fig. 15.
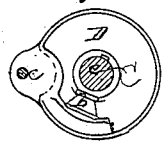
Fig. 11.
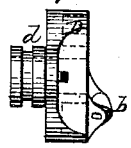
Fig. 12.
Fig. 14.
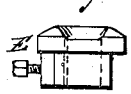
Fig. 16.
Witnesses.
W. Colborne Brookes
W. C. Dey.
Inventor.
Thomas Sands
by his attorney
Thomas L. Stetson

UNITED STATES PATENT OFFICE.

THOMAS SANDS, OF GREENMOUNT, COUNTY OF DUBLIN, IRELAND.

SHEDDING MECHANISM FOR POWER-LOOMS.

SPECIFICATION forming part of Letters Patent No. 250,679, dated December 13, 1881.

Application filed July 3, 1880. (No model.) Patented in England December 11, 1879.

*To all whom it may concern:*

Be it known that I, THOMAS SANDS, of Greenmount, in the county of Dublin, Ireland, have invented new and useful Improvements in Shedding Mechanisms for Power-Looms, of which the following is a specification.

The invention has reference to the construction, arrangement, and working of the shedding-tappet, whereby the same is rendered capable of producing a great variety of patterns.

The invention will be understood as set forth in the following specification and claims.

The accompanying drawings form a part of this specification and illustrate the invention.

Figure 1:
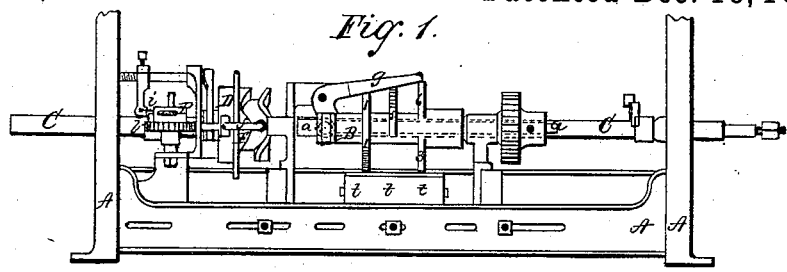
Figure 3:
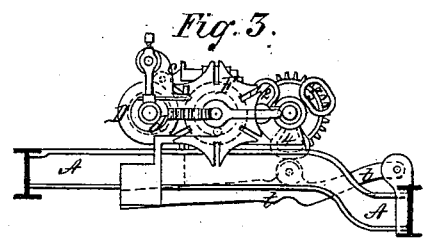
Figure 4:
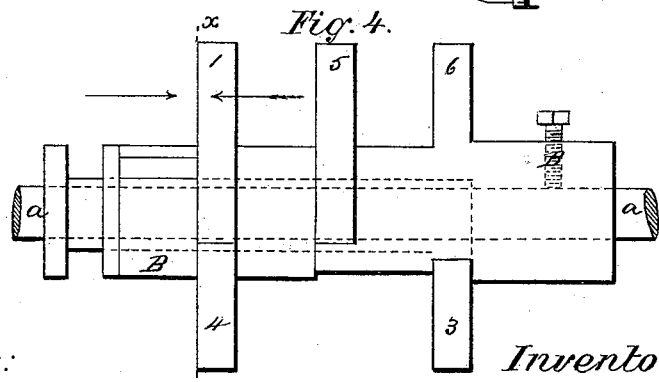

Figure 1 represents an elevation of my improved tappet and its operating mechanism arranged in a portion of the ordinary framework of a power-loom. Fig. 2 is an enlarged plan view of the parts shown in Fig. 1, showing the arrangement whereby lateral motion is imparted to the tappet. Fig. 3 is an end view of the same on the same scale as Fig. 1. Fig. 4 shows in detail the tappet complete mounted on its spindle. Fig. 5 is an end view of the same, looking in the direction indicated by the unbarbed arrow in Fig. 4. Fig. 6 is a cross-section on line $x\ x$, Fig. 4, looking in the direction of the barbed arrow. Figs. 7 and 8 show the tappet in parts, the cams being indicated by numbers 1 to 6, respectively, on all the figures. Figs. 9 and 10 are details showing an elevation and a side view of the grooved cam and star-plate combined. Figs. 11 and 12 show an elevation and a side view of a combined disk and drum, carrying on the face of the latter a bowl or conical roller, and on a projection of the disk a pin. Figs. 13 and 14 represent an elevation and a side view of the pattern-wheel and drum. Figs. 15 and 16 show an elevation and a side view of the cam with a cavity on its bevel-edge. Fig. 17 is a diagram of the outer sleeve portion of the tappet.

Similar letters of reference indicate corresponding parts in all the figures.

A A represent a portion of the ordinary framework of a loom, sufficient to illustrate the working of my invention. B B show the tappet, formed of two parts or tubes working one within the other, as illustrated in detail in Figs. 4 to 8, inclusive. These views show how the parts while rotating on a common spindle, $a\ a$, may be caused to separate laterally when it is desired to vary the action of the cams on the treadles in order to suit the requirements of the various patterns or designs in weaving. The outer part of the tappet, Fig. 8, is keyed to the spindle $a\ a$, and acts as a sleeve for the inner part, Fig. 7, which latter runs loose, and is carried round by being locked in the aforesaid part, as indicated in Fig. 4. Rotary motion is imparted to the tappet-shaft by ordinary spur-gear, as shown to the right in Figs. 1 and 2, and the lateral motion is regulated by the arrangement of parts seen to the left in the same figures. The part of the tappet which is keyed to the shaft and forms the sleeve for the other part is provided with a slot, B', entering it at one end and extending nearly to the other. This slot has offsets $b\ b'$, so that in running into the sleeve it nearly encompasses it before reaching the other end.

The offsets are arranged about the same distance apart and about opposite the cams in the sleeve portion, and the longitudinal slots connecting these offsets extend the distance between the cams. The length of the offsets corresponds with the circumferential difference in the distance between the cams on the moving portion of the tappet, so that this portion may be inserted or removed by suitably turning it until the cams come in line with the lengths of the longitudinal slots, moving it the length of these slots, then turning again in the offsets, and so on until it is in or out; but in use this turning will not take place, and the movement of the sliding portion of the tappet will be confined to the length of one of the longitudinal slots between the offsets.

On the main shaft C is mounted the combined cylinder and disk D, which is free to move laterally on a feather fixed to the shaft, and is provided on its face with a bowl or conical roller, $b$, and a pin, $c$, and on its reverse side is formed with a clutch-groove, $d$, Figs. 11 and 12. In front of this combined cylinder and disk is fixed to the bearing of the main shaft the collar E, having a cavity, $e$, formed on its bevel-edge, Figs. 15 and 16; and on an independent spindle, suitably borne by brackets fixed to the framing, is mounted the combined grooved cam and star-wheel F, Figs. 9 and 10. By means of the zigzag groove in this cam a reciprocating rectilinear motion is imparted to the clutch-fork $f\ f$, which latter acts in a clutch-groove in the tappet and receives the necessary lateral motion from the cam. The point of this clutch-fork, which gears in the zigzag groove, is provided with a friction-roller to facilitate its play therein.

The time for effecting or governing the necessary lateral motion is regulated by means of the needle $i$, the pattern-wheel $l$, and the drum P.

On the main shaft is mounted the worm V, which imparts rotation to the pattern-wheel $l$, upon which latter the drum P rests, and is carried round by the pin $y$, Fig. 14. This drum is perforated or slotted horizontally on its periphery, and against its surface the needle $i$ impinges, so that when the drum, in rotating, presents a perforation or slot to the point of the needle the latter is thrust forward by the force of the spring S, while at the same moment the combined cylinder and disk D is pressed to the right, and the small conical roller $b$ moves into the cavity $e$ of the collar E, and the pin $c$ gears into the radial slots of the star-wheel F, causing the latter to revolve a distance equal to the length of one of the waves of the zigzag groove, and thereby to propel the clutch-fork $f\,f$ in one direction. This motion having been accomplished, the combined disk and cam D is again moved laterally to the left by means of the conical roller $b$, leaving the cavity $e$, and riding on the swelled beveled edge of the collar E. At the next revolution of the shaft the star-plate F will be actuated again in a like manner, when the clutch-fork will be brought to its first position— that is, assuming the needle $i$ is capable of penetrating or entering any of the perforations or slots in the drum P, as above described—for it must be borne in mind that so long as the needle $i$ impinges against the surface of the drum no lateral motion whatever will occur, since the pin $c$ will gear with the star-plate F only when the needle enters the perforations or slots in the drum P. Therefore by altering the number of perforations or the length of the slots in this drum great varieties of patterns in weaving may be produced, for it is obvious that the more frequent the said perforations are, and the longer the slots, the oftener and longer will the needle act. Thus the lateral motion of the tappet is governed by this drum.

The treadles, on which the cams of the tappet act, are indicated at $t\,t$ in Figs. 1, 2, and 3.

Having thus described my said invention, I would have it understood that I do not confine myself to the precise details herein described for imparting lateral movement to my improved tappet, nor for regulating the action of the same, as the details may be modified without departing from the principle of the invention; but

What I consider novel and original, and therefore claim as my invention, is—

1. The combination, with the shaft $a$ and suitable actuating mechanism, of the hereindescribed tappet, having one portion in the form of a sleeve, provided with longitudinal slots and offsets therefrom keyed to the tappet-shaft, and another portion entering said sleeve portion, and locked therein, with capacity for being moved endwise, as shown, and for the purpose set forth.

2. The combination, with the supporting mechanism and actuating mechanism, of the grooved cam and star-wheel F, the disk D, having the conical roller $b$ and pin $c$, the cam E $c$, and clutch-fork $f$, substantially as set forth.

THOMAS SANDS.

Witnesses:
JAMES ANGELO FAHIE, C. E.,
WILLIAM KIRWIN.